United States Patent
Leeder

(10) Patent No.: US 8,667,579 B2
(45) Date of Patent: Mar. 4, 2014

(54) METHODS, SYSTEMS, AND COMPUTER READABLE MEDIA FOR BRIDGING USER AUTHENTICATION, AUTHORIZATION, AND ACCESS BETWEEN WEB-BASED AND TELECOM DOMAINS

(75) Inventor: Michael Leeder, Stittsville (CA)

(73) Assignee: Genband US LLC, Frisco, TX (US)

(*) Notice: Subject to any disclaimer, the term of this patent is extended or adjusted under 35 U.S.C. 154(b) by 57 days.

(21) Appl. No.: 13/306,632

(22) Filed: Nov. 29, 2011

(65) Prior Publication Data
US 2013/0139241 A1 May 30, 2013

(51) Int. Cl.
H04L 12/16 (2006.01)
H04L 12/12 (2006.01)

(52) U.S. Cl.
USPC .................... 726/20; 726/9; 713/185

(58) Field of Classification Search
None
See application file for complete search history.

(56) References Cited

U.S. PATENT DOCUMENTS

2001/0053160 A1 12/2001 Dally

OTHER PUBLICATIONS

SIP APIs for Voice and Video Communications on the Web. Davids et al. Jun. 2011.*

Cisco: Communications Transformations: Implementations Considerations when Enhancing Enterprise Communications Solutions with SIP Trunks. Jun. 2007.*
A Study on the XML-Based Single Sign-On System Supporting Mobile and Ubiquitous Service Environments. Jenog et al. 2004.*
I, Me and My Phone: Identity and Personalization using Mobile Devices. Ghosh et al. Nov. 8, 2007.*
"The OAuth 1.0 Guide: Protocol Workflow," Hueniverse, LLC, pp. 1-9 (Jul. 15, 2011).
Singh, "OAuth: Token-Based Authorization for the Social Networking Age," www.internet.com, pp. 1-3 (Mar. 4, 2010).

* cited by examiner

*Primary Examiner* — Venkat Perungavoor
(74) *Attorney, Agent, or Firm* — Fogarty, L.L.C.

(57) ABSTRACT

Methods, systems, and computer readable media for bridging user authentication, authorization, and access between web-based and telecom domains are disclosed. In one example, a method includes issuing, to an application hosted in a web-based network, an access token associated with a user identifier subscribed to a telecommunications network, wherein the access token is issued in response to receiving telecommunications network credentials from a client device associated with the user identifier and receiving, at an over the top (OTT) proxy element in the telecommunications network from the application, the access token for requesting user data associated with the client device to be used to access the application. The method further includes retrieving the user data if the access token is valid a telecommunications network context condition is met and providing the user data to the application, wherein access to the application by the client device is based on the user data.

24 Claims, 7 Drawing Sheets

METHODS, SYSTEMS, AND COMPUTER READABLE MEDIA FOR BRIDGING USER AUTHENTICATION, AUTHORIZATION, AND ACCESS BETWEEN WEB-BASED AND TELECOM DOMAINS

TECHNICAL FIELD

The subject matter described herein relates to authentication and authorization pertaining to applications. More specifically, the subject matter relates to methods, systems, and computer readable media for bridging user authentication, authorization, and access across web-based and telecom domains.

BACKGROUND

Modern telecommunications networks offer users a vast array of options for connecting and interacting with one another. In addition to choices provided by telecommunications providers themselves, users can now utilize a variety of independently developed products and services that run "on top" of the infrastructure maintained by the telecommunications industry. These independently developed products and services are commonly referred to as over-the-top (OTT) services because these services are not developed with a specific telecommunications provider's network in mind, but rather are designed to interconnect users via a provider-independent platform.

With the proliferation of smartphone, social networks, OTT applications and self-serve application stores, users are increasingly creating their own customized bundles of applications, made up of applications from the telecom, enterprise and Internet domains. Within this disjointed application model, user identification, authentication and authorization has become a difficult management problem, forcing users to manage a large number of individual usernames and passwords, and having to log in multiple times each day, as they invoke different applications. Furthermore, they have to enter their personal information and manage this across all of the application domains that they access.

To address these issues, many of the large OTT sites and social networks have implemented delegated authorization mechanisms, which allow a user to login once to an OTT property, and then to use this login as a single-sign-on mechanism to other applications, and for authorizing other applications to access their personal data. This provides improved user experience for end users, and encourages them to remain anchored and active within the OTT community. These evolving mechanisms present a real problem for the telecom operators, since it encourages users to anchor their application experience in the OTT domains and social networks, which creates a barrier for operators when introducing new telecom hosted applications.

Accordingly, a need exists for methods, systems, and computer readable media for bridging user authentication, authorization, and access across internet and telecom domains.

SUMMARY

The subject matter described herein includes methods, systems, and computer readable media for bridging user authentication, authorization, and access across internet and telecom domains. According to one embodiment, a method includes issuing, to an application hosted in a web-based network, an access token associated with a user identifier subscribed to a telecommunications network, wherein the access token is issued in response to receiving telecommunications network credentials from a client device associated with the user identifier and receiving, at an over the top (OTT) proxy element in the telecommunications network from the application, the access token for requesting user data associated with the client device to be used to access the application. The method further includes retrieving the user data if the access token is valid a telecommunications network context condition is met and providing the user data to the application, wherein access to the application by the client device is based on the user data.

According to another embodiment of the present subject matter, a system includes an application server residing in a web-based network that is configured to host an application and to provide an access token associated with a user identifier subscribed to a telecommunications network, wherein the access token is initially received by the application in response to a client device associated with the user identifier providing telecommunications network login credentials to an OTT proxy element. The system further includes an OTT proxy element that resides in a telecommunications network and is configured to receive the access token from the application server, to retrieve the user data if the access token is valid and a telecommunications network context condition is met, and to provide the user data to the application, wherein access to the application by the client device is based on the user data.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware (such as a processor) and/or firmware for implementing features described herein.

BRIEF DESCRIPTION OF THE DRAWINGS

The subject matter described herein will now be explained with reference to the accompanying drawings of which.

DETAILED DESCRIPTION

Methods, systems, and computer readable media for bridging user authentication, authorization, and access between web-based and telecom domains are provided. According to one aspect, the present subject matter described herein may include a system that enables telecommunications identities (e.g., IMS/SIP) and credentials to be used in an implicit manner to authenticate web users in a single sign on (SSO) operation. The system may also allow user profile, context, ad targeting data, and the like to be authorized and shared with a web based application according to authorization policies. In one embodiment, the present subject matter utilizes a mechanism to integrate token based authorization, such as oAuth 2.0, into the IMS identity architecture. Similarly, the present subject matter may employ a mechanism to extend implicit user authorization to other applications and utilize a dynamic token status to allow authorization status to reflect user context, policy rules, and registration state. Although the following disclosure described the use of oAuth 2.0 tokens, any other token based authentication scheme may be used without departing from the present subject matter.

Figure 1:
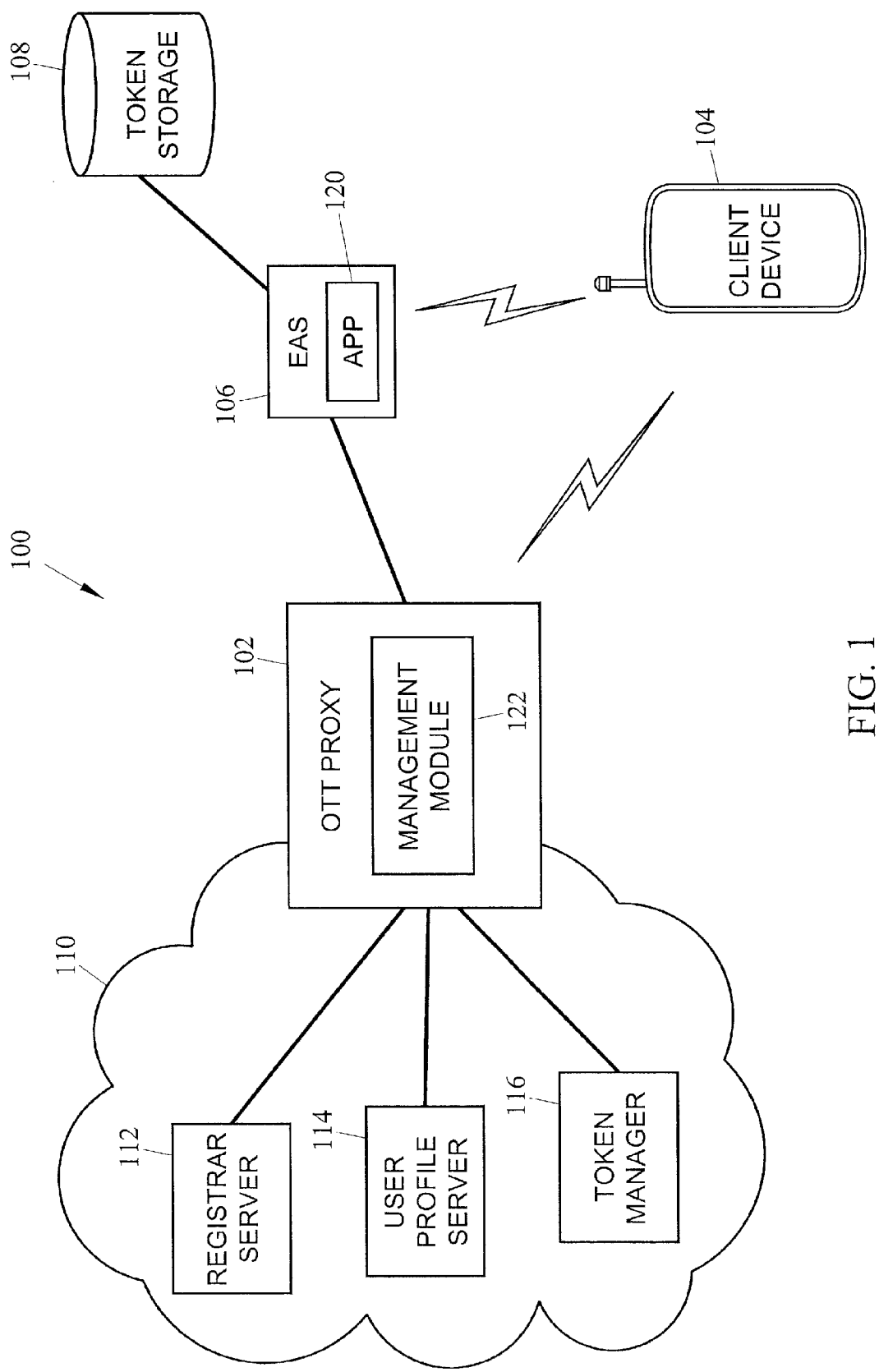
FIG. 1 is a block diagram illustrating an exemplary network for bridging user authentication, authorization, and access across Internet and telecom domains according to an embodiment of the subject matter described herein.

FIG. 1 depicts an exemplary system 100 that comprises an over-the-top (OTT) proxy element 102 (e.g., an OTT proxy gateway, an OTT proxy server, etc.) that resides at the edge of a telecommunications (i.e., telecom) network 110, such as an IP multimedia subsystem (IMS) and/or session initiation protocol (SIP) network. In one embodiment, telecommunications network 110 may include a token manager 116, a user profile server 114, and a registrar server 112. OTT proxy element 102 may also be communicatively connected to an ecosystem application server (EAS) 106 residing in a web-based Internet network. EAS 106 may also be connected to a token storage server or database 108. System 100 may further include at least one client device 104 which may be used by a telecom subscriber to access applications residing in the web-based internet network. Although only one EAS 120 is shown in FIG. 1, additional application servers may be communicatively coupled to OTA proxy element 102 without departing from the scope of the present subject matter.

In one embodiment, client device 104 may include any mobile client device, such as a smartphone, a cellular phone, and a personal digital assistant device, that can access a SIP based telecommunications network. In another embodiment, client device 104 may include a fixed client device, such as a personal computer (PC) or an Internet protocol television (IPTV), that utilizes fixed access (e.g., DSL) to access an application. For example, client device 104 may also include any device that can register with an IMS/SIP network. In one embodiment, client device 104 may be configured to use an active registration state (e.g., an active SIP registration state) to identify, authenticate and authorize itself within web and internet based applications. For example, client device 104 may be configured to utilize an access token to implicitly log into an ecosystem partner application using associated SIP/IMS login information and state. In one embodiment, client device 104 may be provisioned with a non-telecom client application, such as a local web browser. Although the active registration state is described herein as an active SIP registration state, registration states established in other protocols (e.g., a subscriber identification module (SIM) protocol, a radius protocol, a Diameter protocol, a packet data protocol (PDP) context protocol, an extensible messaging and presence protocol (XMPP), etc.) may be utilized without departing from the scope of the present subject matter. In one embodiment, the present subject matter may apply to other forms of registered services, such as an extensible mapping and presence protocol (XMPP) or proprietary systems, such as Skype and the like.

In one embodiment, EAS 106 may include any type of network node, server, or element that resides in the IP network. EAS 106 may be configured to host one or more applications, such as application 120. For example, application 120 may include a web-based application that may require a username and password to establish a log-in session. Although the following disclosure describes application 120 as a web application or web-based application, other applications (e.g., enterprise based applications or mobile device applications) may be utilized without departing from the scope of the present subject matter. EAS 106 may also have access to a token storage entity 108. In one embodiment, token storage entity 108 may include any network element, server, or database residing in the web-based portion of system 100 that is configured to provide user authorization policies and token resolution. For example, token storage entity 108 may maintain and manage saved access tokens issued by OTT proxy element 102. Notably, access tokens stored in token storage entity 108 may be issued by and used to gain access to OTT proxy element 102.

In one embodiment, OTT proxy element 102 may include any network element residing in telecommunications network 110 that is configured to provide a secure bridge between an IMS/SIP network and a web based network. For example, OTT proxy element 102 may utilize a management module 122 to perform a number of functions that coordinate the interactions between a telecommunications network and one or more Internet protocol networks. For example, management module may provide security functions for traffic entering into telecommunications network 110 from the IP network. Management module 122 in OTT proxy element 102 may also be configured to receive web-based application access requests from ecosystem application servers. Notably, management module 122 may manage a plurality of web-based application programming interfaces (APIs) (e.g., HTTP related) that handle incoming requests from web-based applications in the IP network(s). Management module 122 may also coordinate the APIs provisioned on OTT proxy element 102 to map incoming IP-based requests into an appropriate telecommunications protocol and facilitate the interaction with the correct network component in the telecommunications network 110. For example, management module 122 may interact with the voice network by mapping between VoIP voice call protocols and telecom voice call protocols. Management module 122 in OTT proxy element 102 may also manage external APIs that provide a particular quality of service (QoS) to web-based application traffic. In one embodiment, OTT proxy 102 presents and manages REST APIs to external applications (e.g., application 120).

In one embodiment, OTT proxy element 102 may be configured to facilitate the assignment of access tokens. For example, a telecom subscriber associated with client device 104 may attempt to first access a web-based application 120 hosted in an IP network. In instances where client device 104 cannot be authenticated (e.g., is not logged into or registered) by application 120, application 120 may be configured to redirect the client device 104 to a telecom provider's OTT proxy element 102. Client device 104 may then be used to provide its telecommunications based credentials (i.e., not IP based credentials) to OTT proxy element 102. In one embodiment, client device 104 provides a SIP user address and a related password to OTT proxy element 102. In response, OTT proxy element 102 may forward these user credentials to a registrar server 112 to determine if client device has an active SIP registration state and to a user profile server 114 to determine the access policies associated with client device 104. In one embodiment, user profile server 114 may include any network element residing in telecommunications network 110 that is configured to provide identity authorization service. For example, user profile server 114 may maintain and manage identity mappings (e.g., SIP to OTT property), persona identification, and the addition of passwords to IMS profiles. In one embodiment, registrar server 112 may include any network element residing in telecommunications network 110 that is configured to provide user context service. For example, registrar server 112 may maintain and manage persona identification and real-time registration state (e.g., IMS registration and/or SIP registration) of client device 104.

Once authenticated by registrar server 112, a token manager 116 may generate an access token that includes access policies associated with the authenticated client device and at least one application. In one embodiment, token manager 116 may include any network element residing in telecommunications network 110 that is configured to provide user authorization policies and token resolution. For example, token manager 116 may maintain and manage the assignment of privileges (i.e., authorization policies) to tokens based on the application, user, persona, and the like. Token manager 116 may also be used to generate tokens and map tokens to user authorization policies. An exemplary access token may include security information for a log-in session, such as a user's identification, a user's groups, and a user's privileges (e.g., access token policies). In one embodiment, the user's identification may include a SIP public identifier, which may comprise of one or more user attributes such as, an explicit login password, user preferences, usage analytics (e.g., advertisement targeting data), personalization data, charging data (e.g., credit card number), previous visit history, friend/buddy data, and an access grant list (e.g., application identifier, expiry, permissions and policies, etc.).

In one embodiment, the generated token may include access policies that are associated with the authentication session related to the web-based application 120 that the client device 104 is attempting to access. Thus, a telecom provider may utilize OTT proxy element 102 to control the application's access to the telecom network as well as access to profile data and context data associated with client device 104. In one embodiment, the user's context data includes state information related to the user, such as presence information, location information, registration information, and roaming state. Similarly, a user's profile data may include profile authorization rules that are based on day of the week, time of day, active persona, user device type, current access network, and the like.

After the access token is generated, OTT proxy element 102 redirects client device 104 back to application 120. OTT proxy element 102 also provides the application with the access token. In one embodiment, access token exchanges are communicated via a secure transport layer, such as HTTPS (SSL), in order to protect token integrity. Similarly, oAuth 2.0 token exchange may be used to protect the user credentials in the telecommunications network.

Upon receiving the access token, application 120 authenticates client device 104 and provides client device 104 access to the application web site. Notably, the user of client device 104 does not need to obtain a user identifier or establish a password with the IP based application 120. The application 120 may also store the access token in token storage entity 108 (e.g., a dedicated server or database) for later use.

In the event client device 104 makes a subsequent request to access the IP based application 120, application 120 identifies the client device 104 and accesses token storage 108 in order to retrieve the related access token. In one embodiment, the application may identify client device 104 by detecting a cookie user identifier in client device 104. Application 120 may also utilize the cookie user identifier to retrieve the correct access token in token storage 108. The application may then pass the retrieved access token to OTT proxy element 102, which then retrieves user related data associated with client device 104, such as the user's SIP public user identifier and token access policies. Prior to providing the user related data to application 120, OTT proxy element 102 may also determine whether client device 104 is SIP registered and whether the token is valid by communicating with registrar server 112. If client device 104 is SIP registered and the token is still valid, OTT proxy element 102 notifies the application that the user of client device 104 has been authenticated and provides the user profile and context data to application 120. The profile and context data that application 120 is authorized to received is determined by the token policies contained within the access token. After receiving the user profile and context data, application 120 establishes a log-in session for client device 104 and utilizes the user profile and context data to customize the user's experience. Although the above example describes an embodiment based on IMS/SIP registration mechanisms, other stateful registration mechanisms such as packet data protocol (PDP) context establishment, PDP activation, AAA via radius/Diameter registration (e.g., via DSL), a subscriber identification module (SIM) protocol mechanism, an extensible messaging and presence protocol (XMPP) mechanism, a voice over IP application protocol mechanism (e.g., Skype), and presence server state, may be used without departing from the scope of the present subject matter.

Figure 2A:
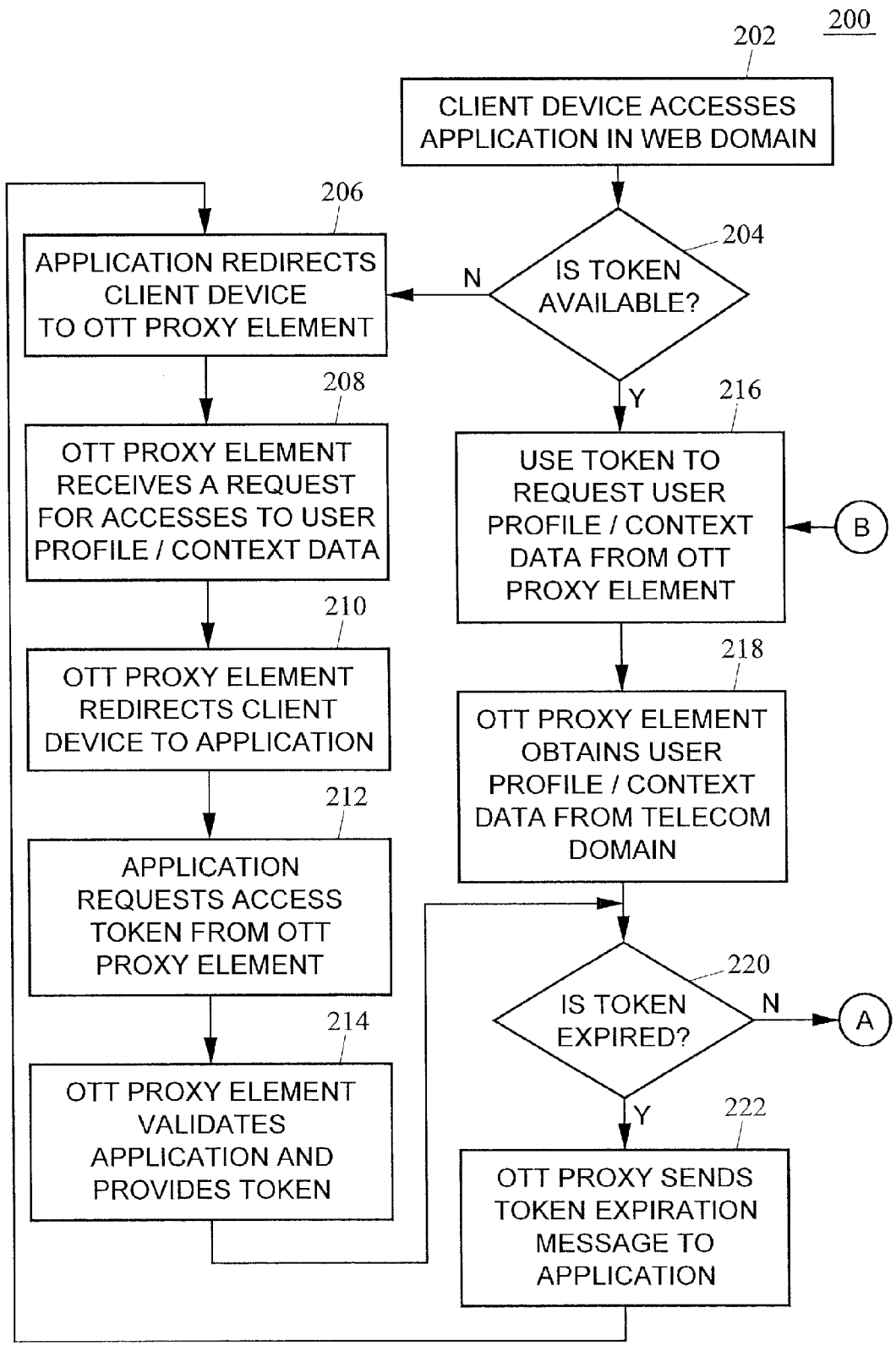
FIG. 2 is a flow chart illustrating an exemplary process for bridging user authentication, authorization, and access across internet and telecom domains according to an embodiment of the subject matter described herein.
Figure 2B:
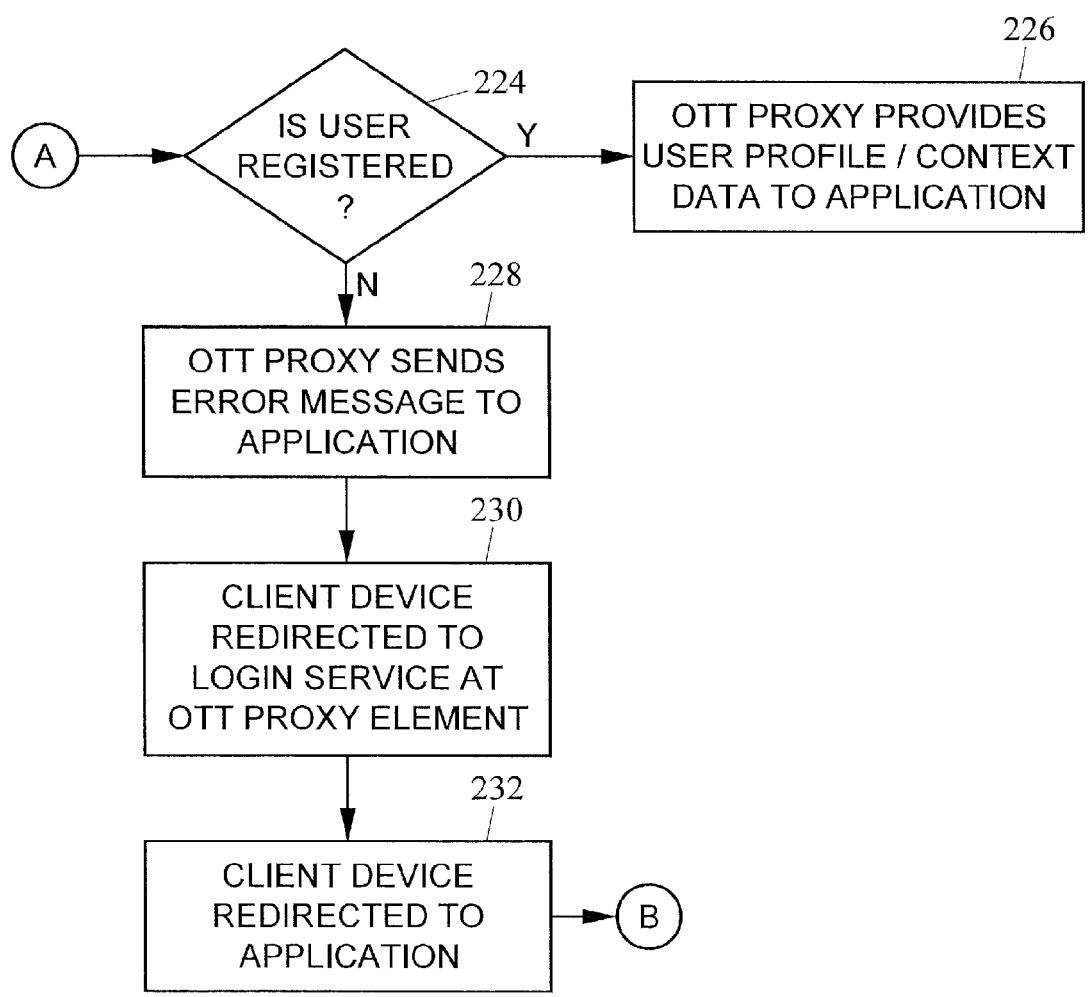

FIG. 2 depicts a flow chart that depicts a method 200 for media for bridging user authentication, authorization, and access between web-based and telecom domains. For example, method 200 discloses a single sign on and user authentication process that may be conducted in accordance with the present subject matter. In block 202, a client device 104 accesses a web application 120 hosted by an EAS 106. For example, client device 104 may access the web application 120 via an HTTP GET message. In one embodiment, EAS 106 resides in a web-based domain and client device 104 is associated with a user subscribed to a SIP-based telecommunications network 110.

In block 204, a determination as to whether an access token is available (if the client device is not logged into the application). For example, application 120 determines if an access token associated with the requesting client device 104 is available in token storage. If the access token is not available, method 200 proceeds to block 206 where application 120 redirects the client device 104 to OTT proxy element 102. In one embodiment, application 120 uses a an HTTP 302 message to redirect client device 104 to OTT proxy element 102 and provide a client identifier and a return URL address associated with application 120. A client application in client device 104 may contact OTT proxy 102 for authentication by providing the client identifier and an application identifier via an HTTP GET message.

In block 208, a request for access to user profile/context data is received. In one embodiment, OTT proxy element 104 presents a web page to client device 104 requesting permission to allow application 120 to access login data associated with client device 104. As used herein, profile data includes static information that may be provisioned and stored. Notably, profile data may includes data that remains static for long periods of time, such as a user name, an address, friend lists, phone numbers, app preferences, display format, and the like. Similarly, context data may include dynamic information that changes frequently, either changed directly by the user or changed due to user behavior or network/environmental conditions. Examples of context data that may be changed by the user include availability status (e.g. Busy, Please do not disturb), current profile photo and persona (e.g., a work profile vs. a home profile). Examples of context information that may change as a result of user behavior or network/environmental conditions may be presence state (e.g., user currently using the phone), user location, and time sensitive conditions. Notably, the present subject matter provides a secure and controlled way for applications to access both statically provisioned and dynamically provisioned user related data that is available within the operator's network.

In block 210, the client device is redirected back to the web application. In one embodiment, after providing permission, client device 104 is redirected back to application 120 via the return URL address. OTT proxy element 102 also provides a unique authorization code to application 120.

In block 212, an access token is requested. In one embodiment, application 120 uses the authorization code and application identifier to request an access token from OTT proxy element 102.

In block 214, the application and authorization code are validated. In one embodiment, OTT proxy element 102 validates application 120 and the provided authorization code. Upon completing the validation process the OTT proxy element 102 provides an access token to the application. OTT proxy element 102 also retrieves the user's SIP login session data and POSTs the login session data to the application 120.

Returning to block 204, if is determined that an access token is available to application 120, then method 200 proceeds to block 216, where user profile/context data is requested from the OTT proxy element. In one embodiment, application 120 passes the access token to OTT proxy element 102 in an attempt to retrieve profile and context data associated with client device 104.

In block 218, the user profile/context data is obtained. In one embodiment, OTT proxy element 102 retrieves a SIP public user identifier and token access polices that are associated with client device 104. OTT proxy element 102 may be configured to retain SIP public user identifier and token access polices if the access token is validated and a telecommunications network context condition is met. An exemplary telecommunications network context condition includes the determination that client device 104 having an active SIP registration. Other exemplary telecommunications network context conditions include an approved subscription state associated with the client device (e.g., permitting access if the user has not exceeded data usage limits) and the presence (e.g., geographical presence) of the client device 104 in the telecommunications network service area.

In block 220, a determination is made as to whether the access token is expired. If the access token is expired and invalid, OTT proxy element 102 notifies application 120 of the expired token via an HTTP 401 unauthorized message and method 200 loops back to block 206 where the token granting sequence is initiated in order to obtain a new access token. If the access token is found to be valid, then method 200 continues to block 224 where a determination is made as to whether client device 104 has an active SIP registration. If the client device 104 is SIP registered, then method 200 continues to block 226 where the OTT proxy element 102 provides user profile/context data to application 120. In one embodiment, OTT proxy element 102 sends a 200 OK message to application 120 to indicate that client device 104 is authenticated. OTT proxy element 102 also sends the SIP user profile and context data that the application is authorized to receive (per the policies indicated in the access token). Application 120 may then log in client device 104 (into application 120) and uses the profile/context data to customize the user's experience within application 120. In one embodiment, customization of the user experience may involve an application to record past user actions and activities related to that application. For example, a given application may store usage logs, recall past purchases on a commerce website, store a history of other people the user has communicated with, displaying the last screen/page, recording an eBook library list, and the like. Application 120 may also store user preferences (e.g., display preferences, preferred instant messaging tool, preferred notification mechanisms, etc.), user profile data (e.g., friend/contact lists, billing/credit card numbers, user display name, profile photos, electronic business cards, etc.), application specific data (e.g., current page in open eBooks, favorite shopping categories for commerce applications, etc.), and user context data (e.g., the user's current location). The present subject matter also allows different applications to have controlled access to different portions of a particular user's profile/context data, which the application may then use to customize that application for the user. For instance, a web site for a store (e.g. Wal-Mart) may use user location information context data and previous shopping behavior for the user to display relevant items which are on sale at local stores. A social network may use contact or call log data to suggest new friends within the social network. A communication app may use the preferred notification mechanism data when new calls/messages arrive.

Returning to block 224, if it is determined that client device 104 is not currently SIP registered, then method 200 proceeds to block 228, where an error message is sent to the web application. In one embodiment, OTT proxy element 102 returns a "User not Registered" error message to application 120.

In block 230, client device is redirected to a login service. In one embodiment, application 120 redirects client device 104 to a login service hosted by OTT proxy element 102. The user may be prompted to interact with the login service by providing a SIP user identifier and a password (i.e., conducting a SIP registration). In one embodiment, by providing a SIP user identifier and password, a user may activate the access token.

In block 232, the client device is redirected to the application. In one embodiment, OTT proxy element 102 may redirect client device 104 to application 120 after the user is authenticated and their registration status as stored in registrar server 112 is changed to "web registered". Specifically, OTT proxy element may redirect client device 104 to application 120. Application 120 may then send an HTTP GET message with the access token to OTT proxy element to restart the single sign on process.

Figure 3:
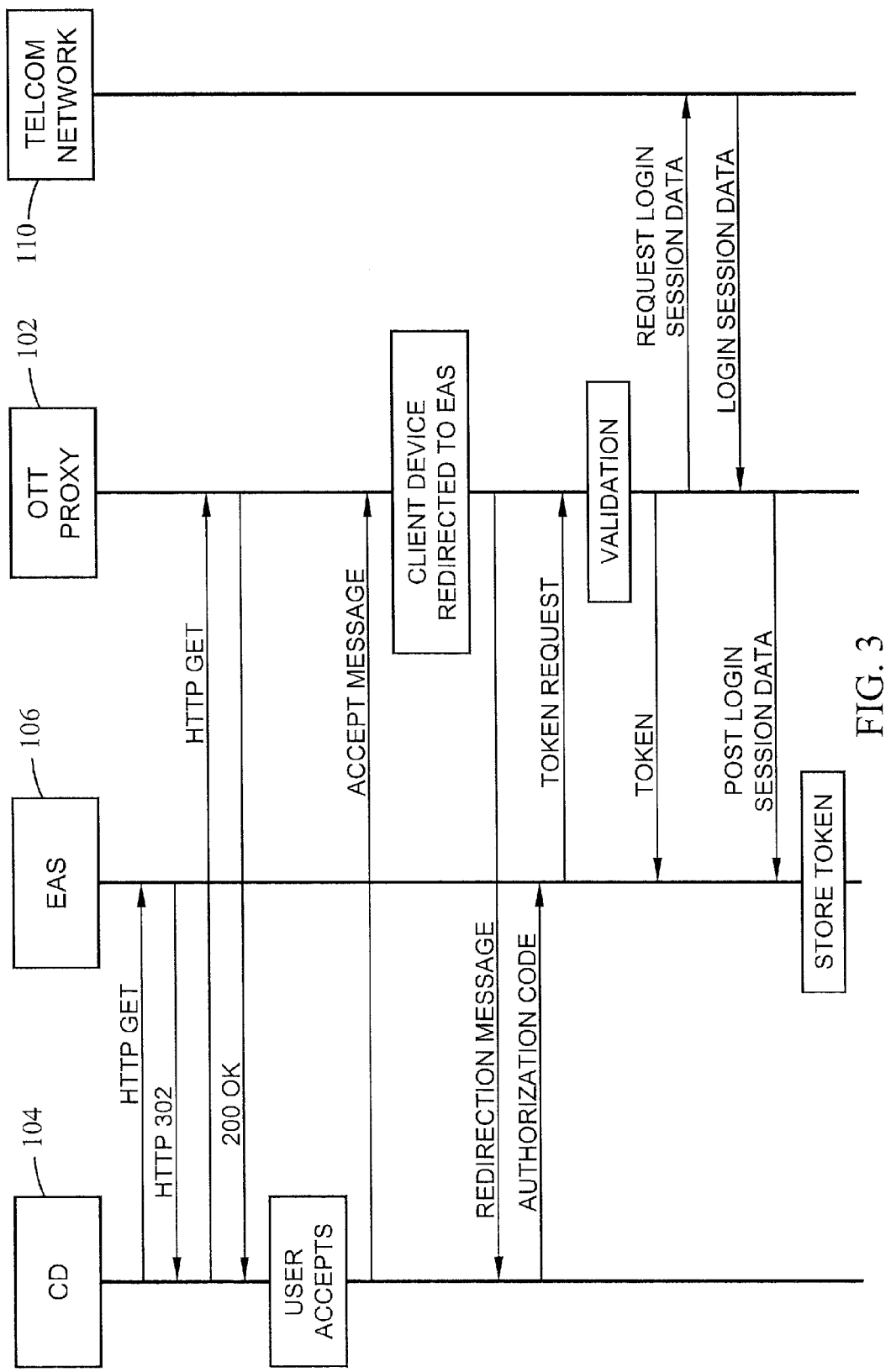
FIG. 3 is a message flow diagram illustrating a request for an access token to an OTT proxy element according to an embodiment of the subject matter described herein.

FIG. 3 illustrates an exemplary messaging flow diagram that depicts a request for an access token from OTT proxy element 102. In this example, a user associated with client device 104 is currently registered in the IMS/SIP network 110 and attempts to use an IMS/SIP login to access an ecosystem application hosted by EAS 106 in a web based domain. In one embodiment, client device 104 may send an HTTP GET message while browsing an ecosystem partner web/cloud application hosted by EAS 106. Upon receiving the HTTP GET message, EAS 106 may determine that the user is not logged into the requested application. The application may then redirect client device 104 to OTT Proxy element 102 for authentication. In one embodiment, EAS 106 may send, to client device 104, an HTTP 302 redirect message that includes both a client/application identifier and a return URL associated the hosted application. The client/application identifier and return URL are stored by OTT proxy element 102 for future use and reference. Client device 104 may then contact OTT proxy element 102 (e.g., via redirection by the application) and provide the client/application identifier via an HTTP GET message. In response, OTT proxy element 102 queries client device 104 for permission to allow the application on EAS 106 to access the user's IMS/SIP login data. In one embodiment, OTT proxy element 102 presents a web page that is displayed on client device 104 that asks the user via a 200 OK message to allow the accessed ecosystem application to access the client's IMS/SIP login data. After client device 104 provides permission, OTT proxy element 102 sends a message to client device 104 that redirects client device 104 to the application hosted at EAS 106. For example, OTT proxy element 102 may send a redirection message that contains the return URL associated with the hosted application and a unique authorization code.

Upon receiving the redirection message, client device 104 uses the return URL to contact EAS 106 and provides the authorization code to the hosted application. The hosted application then uses the authorization code along with an application identifier and application secret (or any other confidential piece of information, such as a long stream of apparently random characters) to request an access token from OTT proxy server 102. In one embodiment, a network operator (e.g., an authentication server) provides the application secret to one or more applications. The receiving application may then be configured to keep the application secret confidential (e.g., the application secret should not be made visible in any manner). In the event an application performs an authentication process, the application provides the application secret back to the authentication server. Thus, an additional layer of security to help ensure the application is recognized by the authentication server.

In response to the access token request, OTT proxy server 102 may validate the application (e.g., comparing the application identifier with the previously provided client/application identifier) and the authorization code and return an access token to the application at EAS 106. OTT proxy element 102 may then retrieve the user's login session data and provides (e.g., POSTs) the user data to the application instance, using the client/application identifier to determine the application URL. In an alternate embodiment, a PULL operation may instead be initiated by the application. After client device 104 is granted access to the hosted application, the hosted application may store the access token for future use and access associated with client device 104.

Figure 4:
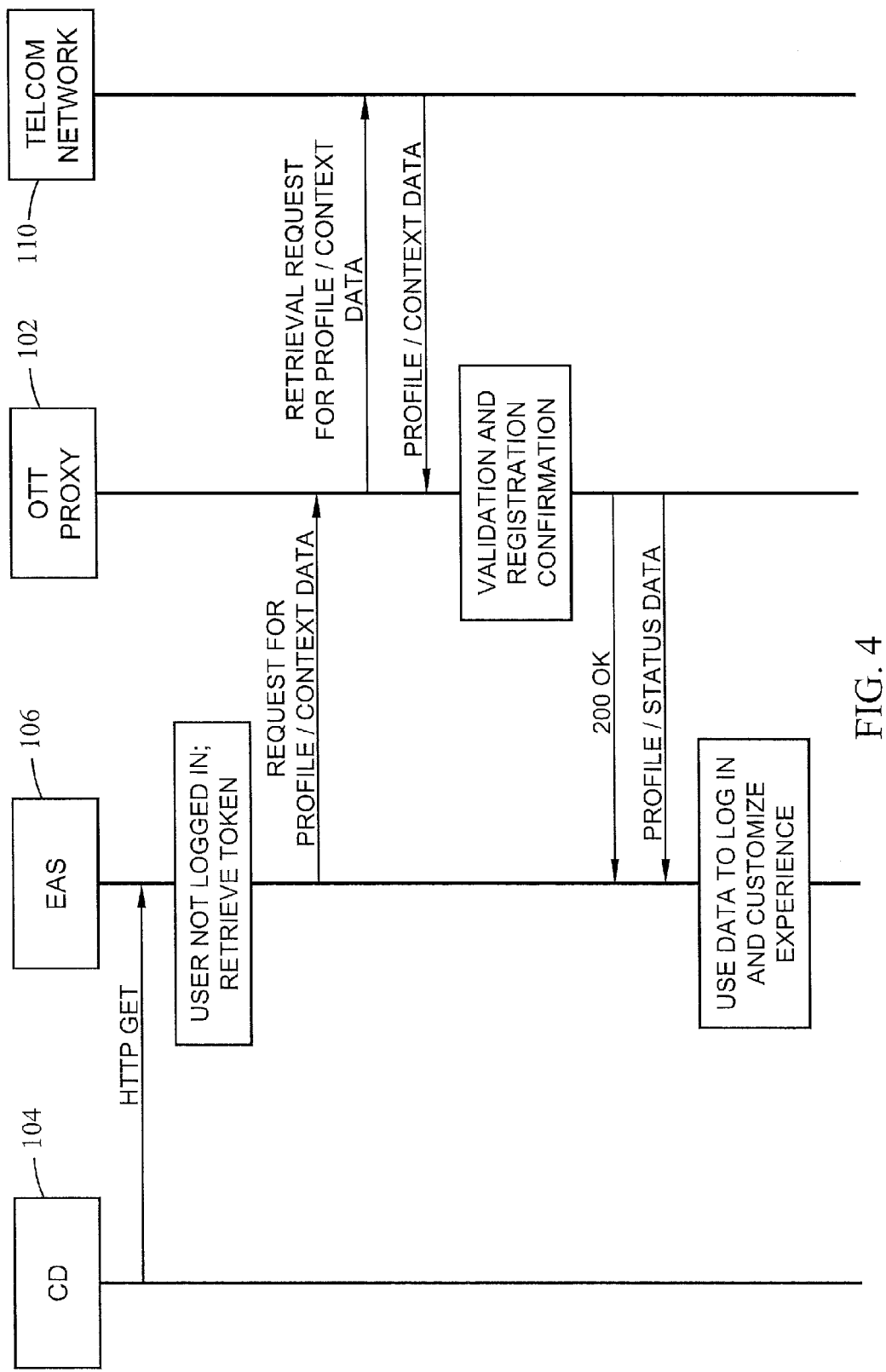
FIG. 4 is a message flow diagram illustrating a single sign on (SSO) procedure where a user is SIP registered according to an embodiment of the subject matter described herein.

FIG. 4 illustrates an exemplary messaging flow diagram that depicts a single sign on (SSO) operation involving OTT proxy element 102. Although the following example describes tokens being used for controlled access to user profile and context data, tokens may also be applied to access other resources, such as APIs and specific data without departing from the present subject matter. In this example, a user is currently registered with the IMS/SIP network 110 and has also previously authorized and logged into an ecosystem application hosted by EAS 106, which resulted in the application receiving an access token (e.g., an oAuth token) to the ecosystem application. In one embodiment, client device 104 is used to access an ecosystem partner application hosted by EAS 106 (e.g., device 104 issues an HTTP GET message to access partner application). In response, EAS 106 identifies the user and/or client device 104 (e.g., by accessing a user identifier cookie on client device 104) and determines that the user is not currently logged into the requested application. EAS 106 may then use the user identifier to access token storage 108 to retrieve a previously issued access token associated with the user from token storage 108. EAS 106 may then attempt to retrieve user data (e.g., SIP/IMS profile/context data) from OTT proxy element 102 by passing the access token to OTT proxy element 102. Upon receiving the access token, OTT proxy element 102 may then access user profile server 114 and requests user data (e.g., a SIP public user identifier, token access policies, etc.) associated with the access token. OTT proxy element 102 may then receive information about the SIP user and determine whether or not the access token is still valid (i.e., has not expired). In one embodiment, the validity of an access token is based on context and policy decisions. OTT proxy element may then also determine whether or not client device 104 is still currently SIP registered.

If the access token is valid and the SIP registration is active, OTT proxy element 102 may return a 200 OK message to indicate that client device 104 has been authenticated. In one embodiment, OTT proxy element 102 may also include the profile and context data the application is authorized to receive (i.e., as indicated in the token policies). In response, an API associated with the partner application may use the access token to login the user and use the returned profile/context data in the access token to customize the user's experience.

Figure 5:
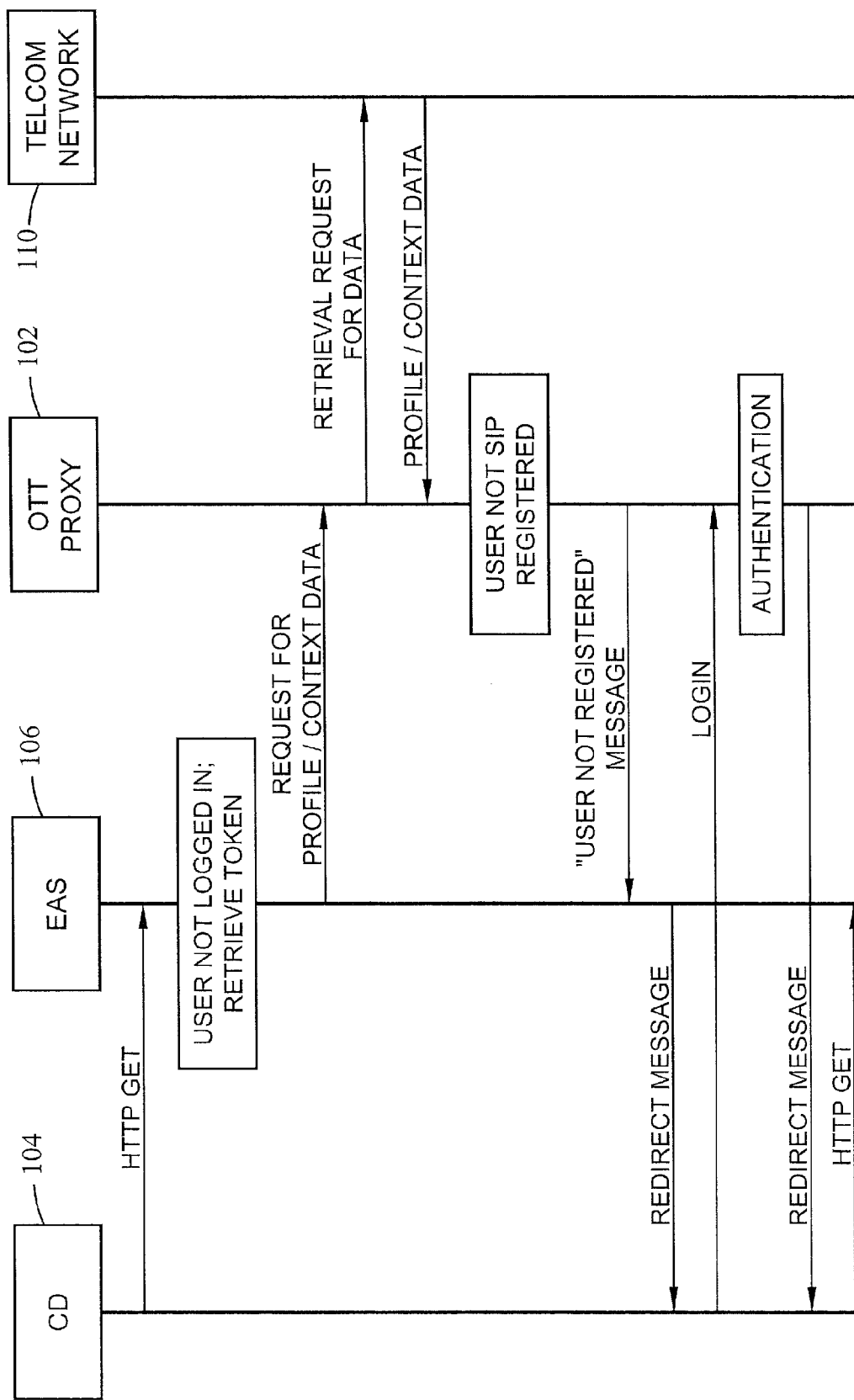
FIG. 5 is a message flow diagram illustrating a single sign on (SSO) procedure where a user is not SIP registered according to an embodiment of the subject matter described herein.

FIG. 5 illustrates an exemplary messaging flow diagram that depicts a single sign on (SSO) operation involving OTT proxy element 102 in the event client device 104 is not SIP registered. In this example, client device 104 has previously registered with IMS/SIP network 110 and is also authorized and logged into an ecosystem application hosted by EAS 106, which resulted in the application previously receiving an access token (e.g., an oAuth token). In one embodiment, the application accesses a browser cookie or unique identifier stored in a client application in client device 104. In one embodiment, client device 104 is subsequently used to access an ecosystem partner application hosted by EAS 106 (e.g., via issuing an HTTP GET message). In response, the application identifies client device 104 (e.g., by recognizing a cookie user identifier) and determines that client device 104 is not currently logged into the requested application. EAS 120 may then retrieve an access token associated with the user from token storage 108. EAS 120 may then attempt to retrieve user SPI/IMS profile/context data from OTT proxy element 102 by passing the access token to OTT proxy element 102. Upon receiving the access token, OTT proxy element 102 may then access user profile server 114 and requests user data associated with the access token, such as a SIP public user identifier, token access policies, and the like. OTT proxy element 102 may then determine whether that client device 104 is not registered with IMS/SIP network 110.

Upon determining that client device 104 is not SIP registered, OTT proxy element 102 may direct a "User not Registered" error message to application 120. In response, application 120 may send a redirect message to client device 104. Client device 104 may then be redirected to a login service supported by OTT proxy element 102. In one embodiment, client device 104 is used to interact with the login service to SIP register by entering a SIP user identifier and password. Client device 104 is then authenticated and the SIP registration status is changed to "web registered". OTT proxy element 102 may then send a redirect message to client device 104 which instructs client device 104 to contact the partner application, which may then reissue the HTTP GET message with the valid access token to OTT proxy element 102.

Figure 6:
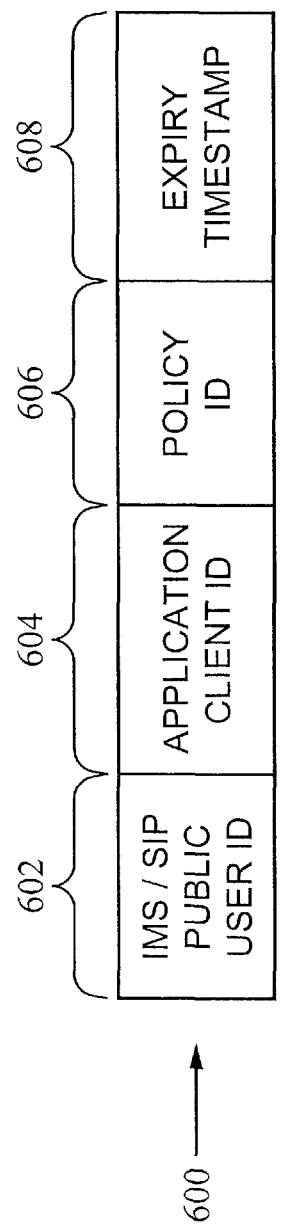
FIG. 6 is a block diagram illustrating an exemplary token architecture according to an embodiment of the subject matter described herein.

FIG. 6 is a block diagram of an exemplary access token architecture. An access token is a mechanism which allows user profiles, context, ad targeting data and the like to be authorized and shared according to authorization policies, such as polices maintained at network PCRFs. Token 600 may be depicted as comprising at least four portions that include an IMS/SIP public user identifier 602, an application client identifier 604, a policy identifier 606, and an expiry timestamp 608. In one embodiment, IMS/SIP public user identifier 602 may be made up of an OTT proxy user profile that includes user credentials and a list of active tokens associated with the user. IMS/SIP public user identifier 602 may also include an HSS profile and/or a user profile that each contains a service filtering policy and transparent data. Policy identifier 606 may contain an authorization policy that includes token validity rules, API restrictions, and SLA limits.

In one embodiment, policy identifier 606 may include a number of different customized usage policies attached to access token 600. For example, policy identifier 606 may include fields that indicate the SIP registration status of the user, different roaming statuses (e.g., active vs. suspended) associated with different types of calling networks (e.g., home, roaming domestic, roaming international, etc.) utilized by the user, the API usage associated with the user (e.g., whether to allow or block instant messaging or presence notifications), and an API SLA associated with the user (e.g., whether a call should be allowed, throttled, or blocked depending on how may calls the user receives in an hour). For each of these fields, policy identifier 606 may also include an associated specific policy field. For example, if the user is not SIP registered, policy identifier 606 may prompt the user for login credentials. If the user is SIP registered, then policy identifier 606 may indicate an active status associated with the user. Similarly, if the client device associated with the user is in the home network or roaming domestically, then the policy associated with this particular token may indicated that roaming capabilities are activated. In contrast, if the client device is roaming internationally, the policy may indicate that roaming capabilities are suspended. Token 600 may also include API usage and API SLA policies associated with the client device. For example, the policy may indicate that the client device may receive an unlimited number of UM notifications, but may block all presence notifications.

In short, token 600 may include a usage policy that is customized for each particular client device. For example, customized SLA grades, customized authentication behaviors and customized authorization levels for different users and applications may be included in each particular token. In addition, modifications made to token 600 enables a network operator to dynamically change a user's authorization status to reflect user context, policy rules, and registration state.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for bridging authentication, authorization, and access between web-based and telecommunications networks, the method comprising:
   issuing, to an application hosted in a web-based network, an access token associated with a user identifier subscribed to a telecommunications network, wherein the access token is issued in response to receiving telecommunications network credentials from a client device associated with the user identifier, and wherein the access token includes an oAuth-based token;
   receiving, at an over the top (OTT) proxy element in the telecommunications network from the application, the access token for requesting user data associated with the client device to be used to access the application;
   retrieving the user data if the access token is valid and a telecommunications network context condition is met; and
   providing the user data to the application, wherein access to the application by the client device is based on the user data.

2. The method of claim 1 wherein the application includes at least one of: a web application, an enterprise based application, and a mobile device application.

3. The method of claim 1 wherein the client device includes at least one of: a mobile device and a fixed device.

4. The method of claim 1 wherein the telecommunications network context condition includes at least one of: the client device having an active registration in the telecommunications network, an approved subscription state associated with the client device, and the presence of the client device in the telecommunications network.

5. The method of claim 4 wherein the active registration includes an active registration in accordance with at least one of: a subscriber identification module (SIM) protocol, a radius protocol, a Diameter protocol, a packet data protocol (PDP) context protocol, an extensible messaging and presence protocol (XMPP), a voice over IP application protocol, and session initiation protocol (SIP).

6. A method for bridging authentication, authorization, and access between web-based and telecommunications networks, the method comprising:
   issuing, to an application hosted in a web-based network, an access token associated with a user identifier subscribed to a telecommunications network, wherein the access token is issued in response to receiving telecommunications network credentials from a client device associated with the user identifier, wherein issuing an access token includes:
      receiving, at the OTT proxy element, a request for authentication for access to the application from the client device, wherein the request includes an application identifier associated with the application;
      providing an access token authorization code to the application in response to authenticating the client device;
      receiving, at the OTT proxy element, an access token request containing the authorization code and the application identifier; and
      providing the access token to the application in response to validating the application identifier and the authorization code;
   receiving, at an over the top (OTT) proxy element in the telecommunications network from the application, the access token for requesting user data associated with the client device to be used to access the application;

retrieving the user data if the access token is valid and a telecommunications network context condition is met; and providing the user data to the application, wherein access to the application by the client device is based on the user data.

7. The method of claim 1 wherein the user data includes at least one of: a session initiation protocol (SIP) public user identifier, token access policies, user profile data, user context data, and user status data associated with the client device.

8. The method of claim 1 wherein the client device includes a non-telecom client application.

9. The method of claim 1 wherein the user data includes token privileges that control access to application programming interfaces, network services, and static user data.

10. The method of claim 1 wherein the telecommunications network includes at least one of: a session initiation protocol (SIP) based network and an Internet protocol multimedia subsystem (IMS) based network.

11. The method of claim 1 wherein providing the access token includes providing the access token over a secure transport layer.

12. The method of claim 11 wherein the secure transport layer utilizes a hypertext transfer protocol secure (HTTPS) protocol.

13. A system for bridging authentication, authorization, and access between web-based and telecommunications networks, the system comprising:

an application server residing in a web-based network that is configured to host an application and to provide an access token associated with a user identifier subscribed to a telecommunications network, wherein the access token is initially received by the application in response to a client device associated with the user identifier providing telecommunications network login credentials to an OTT proxy element; and an OTT proxy element that resides in a telecommunications network and is configured to receive the access token from the application server, to retrieve the user data if the access token is valid and a telecommunications network context condition is met, and to provide the user data to the application, wherein access to the application by the client device is based on the user data, and wherein the OTT proxy element is further configured to receive a request for authentication for access to the application from the client device, wherein the request includes an application identifier associated with the application, to provide an access token authorization code to the application in response to authenticating the client device, to receive, at the OTT proxy element, an access token request containing the authorization code and the application identifier, and to provide the access token to the application in response to validating the application identifier and the authorization code.

14. The system of claim 13 wherein the application includes at least one of: a web-based application, an enterprise based application, and a mobile device application.

15. The system of claim 13 wherein the client device includes at least one of: a mobile device and a fixed device.

16. The system of claim 13 wherein the telecommunications network context condition includes at least one of: the client device having an active registration in the telecommunications network, an approved subscription state associated with the client device, and the presence of the client device in the telecommunications network.

17. The system of claim 16 wherein the active registration includes an active registration in accordance with at least one of: a subscriber identification module (SIM) protocol, a radius protocol, a Diameter protocol, a packet data protocol (PDP) context protocol, an extensible messaging and presence protocol (XMPP), a voice over IP application protocol, and session initiation protocol (SIP).

18. The system of claim 13 wherein the user data includes at least one of: a SIP public user identifier, token access policies, user profile data, user context data, and user status data associated with the client device.

19. A system for bridging authentication, authorization, and access between web-based and telecommunications networks, the system comprising:

an application server residing in a web-based network that is configured to host an application and to provide an access token associated with a user identifier subscribed to a telecommunications network, wherein the access token is initially received by the application in response to a client device associated with the user identifier providing telecommunications network login credentials to an OTT proxy element, and wherein the access token includes an oAuth token; and an OTT proxy element that resides in a telecommunications network and is configured to receive the access token from the application server, to retrieve the user data if the access token is valid and a telecommunications network context condition is met, and to provide the user data to the application, wherein access to the application by the client device is based on the user data.

20. The system of claim 13 wherein the client device includes a non-telecom client application.

21. The system of claim 13 wherein the user data includes token privileges that control access to application programming interfaces, network services, and static user data.

22. The system of claim 13 wherein the telecom-based network includes at least one of: a session initiation protocol (SIP) based network and an Internet protocol multimedia subsystem (IMS) based network.

23. The system of claim 13 wherein the OTT proxy element is further configured to provide the access token over a secure transport layer.

24. The system of claim 23 wherein the secure transport layer utilizes a hypertext transfer protocol secure (HTTPS) protocol.

* * * * *